US007762302B2

(12) United States Patent
Dangami

(10) Patent No.: US 7,762,302 B2
(45) Date of Patent: Jul. 27, 2010

(54) LABEL PRINTER

(75) Inventor: Akira Dangami, Tokyo (JP)

(73) Assignee: Lintec Corporation, Tokyo (JP)

( * ) Notice: Subject to any disclaimer, the term of this patent is extended or adjusted under 35 U.S.C. 154(b) by 516 days.

(21) Appl. No.: 11/720,718

(22) PCT Filed: Dec. 7, 2005

(86) PCT No.: PCT/JP2005/022431

§ 371 (c)(1),
(2), (4) Date: Jun. 1, 2007

(87) PCT Pub. No.: WO2006/062116

PCT Pub. Date: Jun. 15, 2006

(65) Prior Publication Data

US 2010/0006232 A1 Jan. 14, 2010

(30) Foreign Application Priority Data

Dec. 8, 2004 (JP) ............................ 2004-355318

(51) Int. Cl.
*B65C 9/18* (2006.01)
*B65C 9/26* (2006.01)
*B29C 65/08* (2006.01)
*B30B 1/00* (2006.01)
*B30B 15/00* (2006.01)

(52) U.S. Cl. .................... 156/387; 156/443; 156/477.1; 156/541; 156/542; 156/580; 156/583.8

(58) Field of Classification Search ................. 156/192, 156/196, 199, 202, 204, 217, 226, 227, 216, 156/230, 238–241, 247, 277, 289, 250, 257, 156/387, 443, 447.1, 478–480, 483, 540–542, 156/556, 566, 515, 569, 572, 538, 475, 580, 156/581, 583.8, DIG. 1, DIG. 5, DIG. 8, 156/DIG. 23, DIG. 28, DIG. 33, DIG. 37, 156/DIG. 42, 477.1
See application file for complete search history.

(56) References Cited

U.S. PATENT DOCUMENTS 4,255,220 A 3/1981 Kucheck et al.

(Continued)

FOREIGN PATENT DOCUMENTS

JP 05-229541 A 9/1993

(Continued)

*Primary Examiner*—Philip C Tucker
*Assistant Examiner*—Sing P Chan
(74) *Attorney, Agent, or Firm*—Lowe Hauptman Ham & Berner, LLP

(57) ABSTRACT

There is provided a label printer 10 that performs printing on a label L including a front-part label area L1 located at the front side in the feed-out direction and a rear-part label area L2 which is connected thereto. The label printer 10 comprises a printing unit 12 that performs printing on the label L, a sticking unit 14 that sticks the label L to an object W while holding the label L and a turn-over device 15 that turns over the front-part label area L1 to the rear face side of the rear-part label area L2. The sticking unit 14 is arranged so as to stick the label L to the object W after the front-part label area L1 is turned over and attached to the rear-part label area L2 by the turn-over device 15.

8 Claims, 7 Drawing Sheets

U.S. PATENT DOCUMENTS 5,785,804 A * 7/1998 Kovacs et al. ............... 156/556
6,511,569 B1 * 1/2003 Nixon et al. ................ 156/227

FOREIGN PATENT DOCUMENTS

JP 2001-246882 A 9/2001
JP 2003-002312 A 1/2003
JP 2003-261118 A 9/2003
JP 63-115-168 U 5/2007
WO 2006/062116 A1 6/2006

* cited by examiner

LABEL PRINTER

RELATED APPLICATIONS

The present application is based on, and claims priority from International Application No. PCT/JP05/022431, filed Dec. 7, 2005 and Japan Application Number 2004-355318, filed Dec. 8, 2004, the disclosures of which are hereby incorporated by reference herein in their entirety.

TECHNICAL FIELD

The present invention relates to a label printer, in particular to a label printer having a function to stick a label to an object to be stuck with the label by sandwiching a part of the label between the object and the label.

TECHNICAL BACKGROUND

Recently, as a global-wide expansion of the Internet, TV shopping and the like in addition to the conventional over-the-counter sale, mail-order sale has come into wide use. In the mail-order sale, a deliverer delivers an article in place of a seller. As common payment methods for the mail-order sale, Bank transfer, payment via a credit card, postal transfer and payment at a convenience store are adopted. On the other hand, for consumers who feel inconvenience in calling at a monetary institution or the like, or consumers who are concerned about the private information leakage, payment-on-delivery method is predominantly adopted.

In the case of the payment-on-delivery method, the deliverer covers additional function as a money collection agent. Therefore when handing over an article to a consumer and collecting money, the deliverer has to issue a receipt. Since the receipt has such a characteristic that the value of packed articles can be comprehended from the amount of money, such information should be concealed from the view point of antitheft and the like. Articles description indicating the content of the packed articles or the like is also the information relevant to consumer's privacy and to be concealed. Particularly, articles description or the like is information not to be disclosed even to the deliverer.

In view of this point, when the delivery slips have such structure that a plurality of forms are stacked into a bundle, the receipt and the article description can be scripted in a part of the delivery slips so that the article can be handed over to the consumer in a state that the confidentiality is secured. When delivery slips of this type are employed, the label printer therefor is limited to a dot impact printer and the like.

Consequently, in order to eliminate such limitation on the availability of printers, a sheet type delivery slip can be employed. In the case of such delivery slips, however, confidential information not to be opened to others can be observed from the outside.

A patent document 1 discloses a label, which can be used as a sheet type delivery slip. The label is a sheet type label which includes a confidential information slip portion connected to an opened information slip portion. The label is arranged in such a way that the confidential information slip portion is turned over to the rear face of the opened information slip portion and the opened information slip portion is stuck to the object, thereby confidential information slip portion can be protected from the observation from the outside.

[Patent document 1] Japanese Patent Application Laid-Open No. 2001-246882

SUMMARY OF THE INVENTION

Problem to be Solved by the Invention

However, the label arranged as proposed in the patent document 1 requires a turning over process. Therefore, it is impossible to print the label with an ordinary label printer and stick it to the object. Moreover, when the label is stuck manually to the object by manpower, there arises such a problem that a large amount of labor is consumed for sticking the label.

OBJECT OF THE INVENTION

The present invention has been proposed in view of the above-mentioned disadvantages. It is an object of the present invention to provide a label printer that has a function to stick a label onto a predetermined object in a state that a part of the label is turned over to the rear face side to conceal the same.

MEANS FOR SOLVING THE PROBLEM

To achieve the above object, a label printer of the present invention adopts the following arrangement; i.e., a label printer comprises:

a printing means that, while feeding out a raw sheet which is temporarily stuck with labels on one surface of a release liner, performs printing on the labels;

a peeling means that peels off labels from the release liner; and a sticking means that sticks the label by pressing the label onto a predetermined object while holding the label, which is peeled off by the peeling means, wherein:

a turn-over means that turns over a part of the label to the rear face side thereof is provided along with the sticking means; and the sticking means sticks the label to the object in a state that a part area of the label, which has been turned over to the rear face side thereof by the turn-over means, is sandwiched between the object and the label.

Also, a label printer of the present invention adopts the following arrangement; i.e., a label printer comprises:

a printing means that, while feeding out a raw sheet which is temporarily stuck with labels on one surface of a strip shaped release liner, performs printing on the labels;

a peeling means that peels off labels from the release liner; and a sticking means that sticks the label by pressing the label onto a predetermined object while holding the label, which is peeled off by the peeling means, wherein:

the label has a configuration including a first label-forming area and a second label-forming area, which is connected to the first label-forming area and has a larger plane area than the first label-forming area;

a turn-over means that turns over the first label-forming area to the rear face side of the second label-forming area, is placed along with the sticking means; and the sticking means sticks the second label-forming area onto the object in a state that an adhesive surface of the first label-forming area is adhered to an adhesive surface of the second label-forming area and sticks the second label-forming area onto the object in a state that the first label-forming area is sandwiched between the object and the second label-forming area.

In the label printer of the present invention, the turn-over means includes a turn plate, which can turn between a first position aligned with a label holding surface of the sticking means and a second position which faces the label holding surface, and the turn plate rotates from the first position to the second position in the state that a part of the label is sucked, thereby turning over the label.

The label holding surface of the turn plate is arranged so as to have a substantially same area as that of the label area to be turned over.

The turn-over means may be arranged so as to be held in a non-operation state, and the sticking means is arranged so as to allow sticking of labels which do not require turning over.

EFFECT OF THE INVENTION

The label printer according to the present invention is arranged, taking a discrete label peeled off from the release liner as an object for printing, to turn over a part of the label to the rear face side. Accordingly, after performing the printing on the label surface, the label can be stuck on the object in a state that the printed content in the area turned over to the rear face side is concealed.

Also, the label holding surface of the turn plate constituting the turn-over means has substantially the same plane area as that of the label to be turned over. Therefore, the label holding surface of the turn plate is prevented from adhering to the adhesive surface of the area of the label held by the sticking means.

Moreover, when the label is not required to be turned over, the sticking means can perform the sticking operation of the label to the object, hence the versatility of a label printer having sticking mechanism can be maintained.

DESCRIPTION OF REFERENCE NUMERAL

Figure 1:
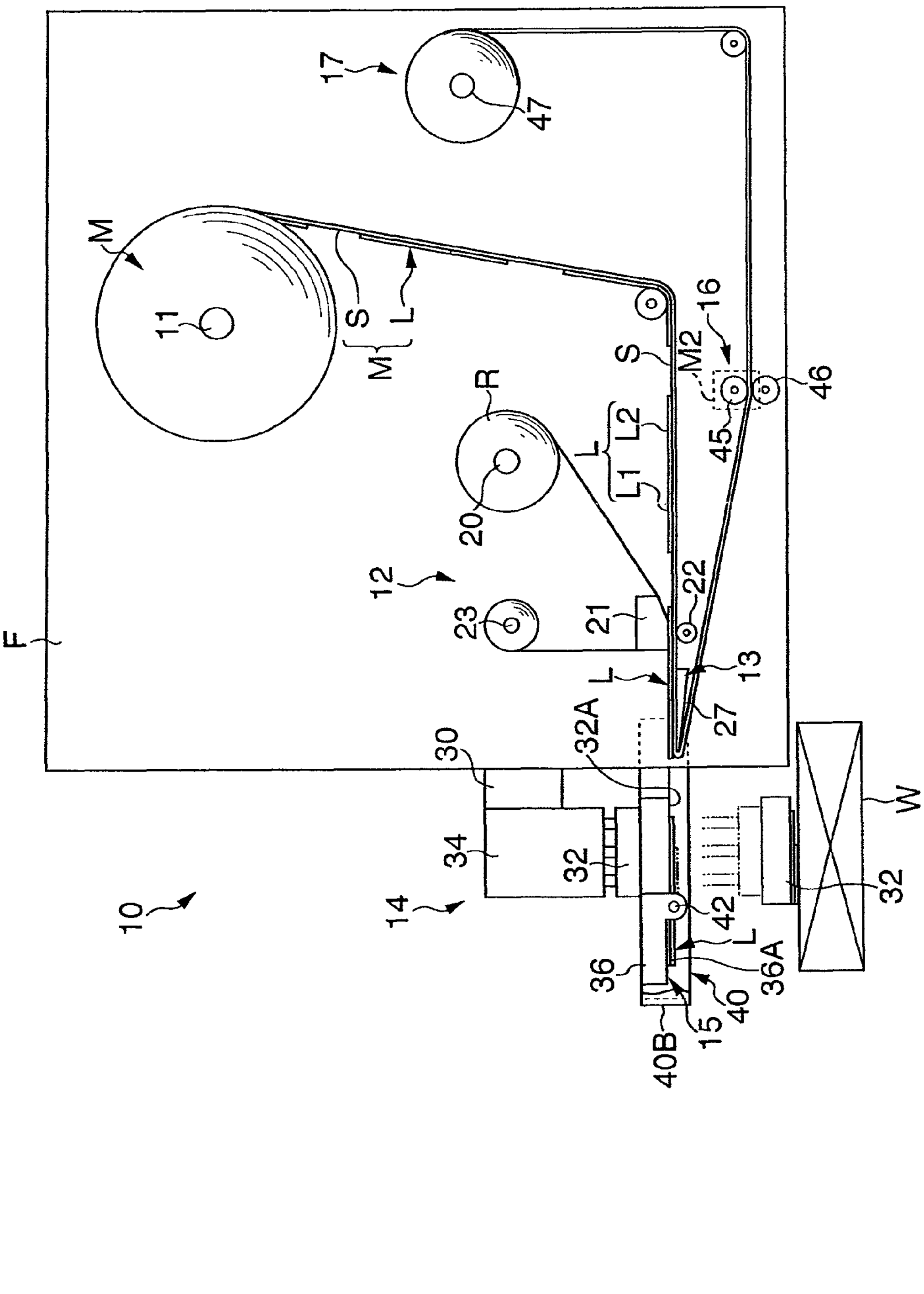
FIG. 1 is a schematic front view showing a label printer according to an embodiment of the present invention.

10 label printer
12 printing means
13 peeling means
14 sticking means
15 turn-over means
21 printing head
32 suction plate
32A rear-part label holding surface
36 turn plate
36A front-part label holding surface
S release liner
L label
L1 front-part label area (first label-forming area)
L2 rear-part label area (second label-forming area)
M raw sheet

PREFERRED EMBODIMENT FOR WORKING THE INVENTION

Embodiments of the present invention will be described below with reference to the drawings.

FIG. 1 is a schematic front view showing a label printer according to the embodiment. Referring to FIG. 1, a label printer 10 comprises a frame F, a support roll 11 disposed within an area of the frame F and supporting a raw sheet M, which is temporarily stuck with a label L on one surface of a strip of release liner S, so that the raw sheet M can be fed out, a printing means 12 that performs printing on the label L in the middle of feeding out the raw sheet M, a peeling means 13 that peels off the label L from the release liner S, a sticking means 14 that sticks the label L peeled off by the peeling means 13 to an object W, a turn-over means 15 that turns-over a part of the label L to its backside, a feed-out unit 16 that feeds out the raw sheet M at a predetermined timing, and a winding means 17 that winds the release liner S from which the label L has been peeled off.

Figure 2:
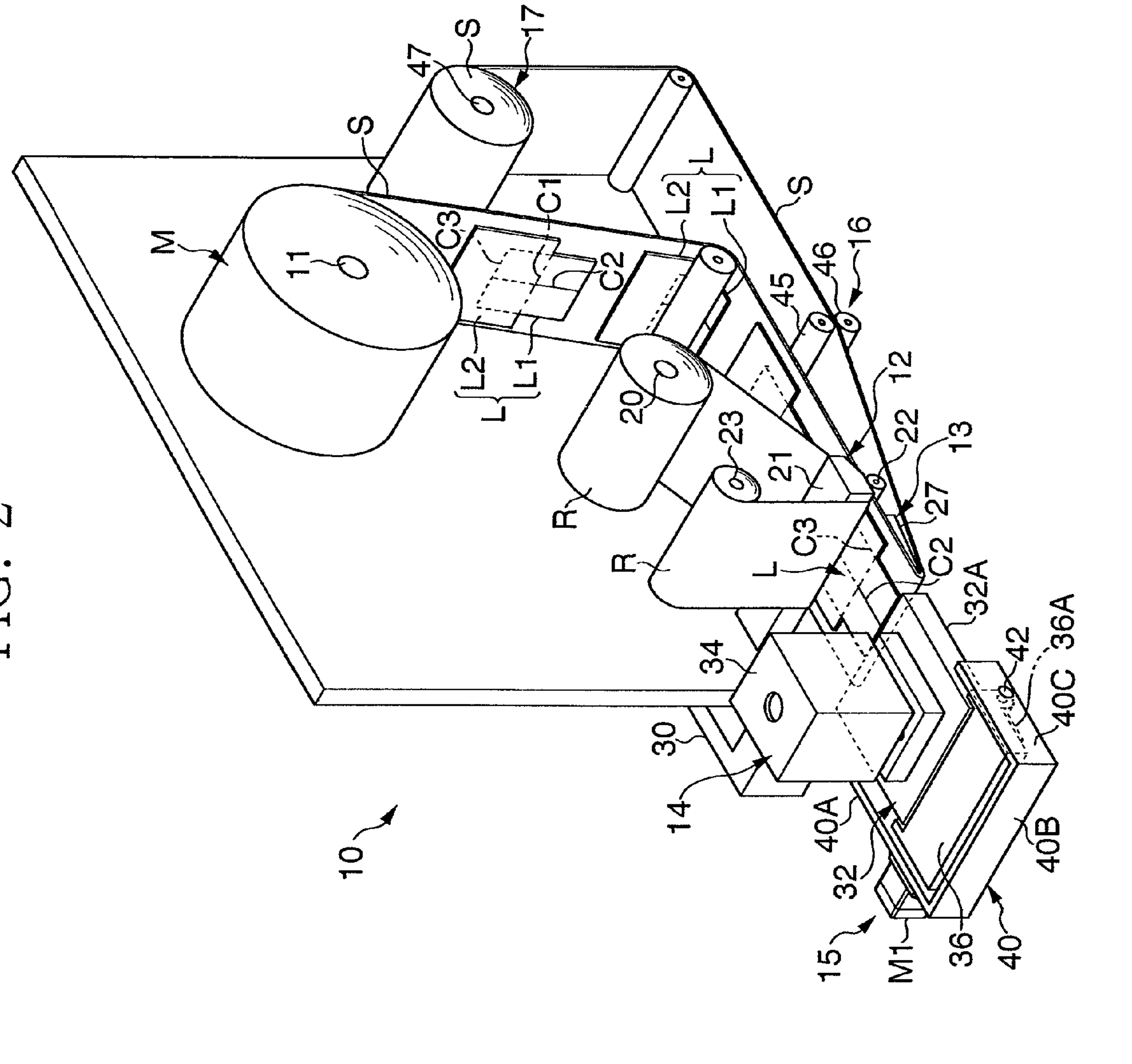
FIG. 2 is a schematic perspective view of the label printer.

As a raw sheet M in this embodiment, as shown in FIG. 2, such raw sheet M is adopted that labels L are temporarily stuck on the release liner S via an adhesive surface thereof at predetermined intervals along an extending direction. The raw sheet M can be formed in the following manner. That is, half-cuts corresponding to a label shape are formed at predetermined intervals on a strip-shaped label base material, which has an identical width to that of the release liner S. Then, a peripheral part of the label base material outside of the label L is peeled off as waste. It should be noted that when a die-cut device for forming the half-cut and a waste winding unit are provided within the label printer 10, the printing can also be carried out on the label L while forming the label L.

Figure 3:
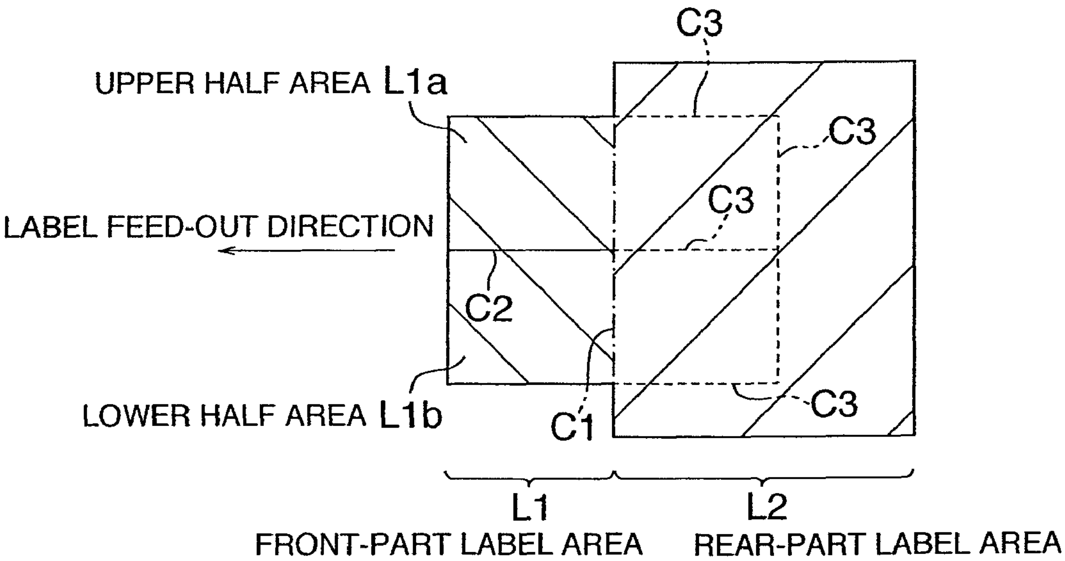
FIG. 3 is a plane view of a label used for the label printer.
Figure 4:
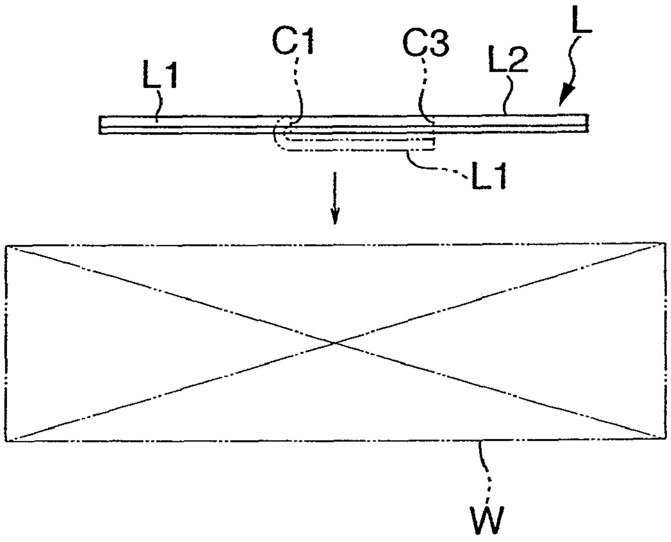
FIG. 4 is a schematic front view showing a state that the label is turned over and stuck onto an object.

The label L is arranged to include a front-part label area L1 as a first label-forming area (shaded area at the left side in FIG. 3) and a rear-part label area L2 connected to the front-part label area L1 as a second label-forming area (shaded area at the right side in FIG. 3). The front-part label area L1 is to become the rear face of the rear-part label area L2; i.e., an area that is turned over to the adhesive surface side of the rear-part label area L2. On the front-part label area L1, confidential information not to be opened is printed. On the rear-part label area L2, when the object is, for example, a home delivery article, information that is not required to be concealed such as receiver's address and sender of the article is printed. The longitudinal and transversal lengths of the rear-part label area L2 are set longer than those of the front-part label area L1 so as to have a larger area than that of the front label as shown in FIG. 3 and FIG. 4. Therefore, when the front-part label area L1 is turned over to the adhesive surface side of the rear-part label area L2 at the position of a folding line C1 which is a boundary therebetween, the adhesive surface of the rear-part label area L2 is left in the three peripheral sides of the front-part label area L1, and thus the surface to be adhered to the object W is conserved. In a substantially central area of the front-part label area L1, a cut line C2 is formed along the feed-out direction of the raw sheet M. Also, at positions corresponding to the outer edges of the front-part label area L1 and the cut line C2 when the front-part label area L1 is turned over to the rear face of the rear-part label area L2, perforated lines C3 which allow cut-off are formed. The cut line C2 may be a perforated line.

The printing means 12 comprises a ribbon holding roll 20 that holds an ink ribbon R wound in a roll-like shape, a printing head 21 that prints predetermined printing information with the ink ribbon R fed out from the ribbon holding roll 20 and laid to be wound thereon, a platen 22 opposing to the printing head 21 via the raw sheet M, a ribbon winding roll 23 for the ink ribbon R, and a drive unit (not shown) that drives to rotate the ribbon winding roll 23. The printing head 21 in this embodiment includes a thermal head and the printing is carried out using the ink ribbon R. When the label L is formed of a heat sensitive paper, the ink ribbon R is not necessary. An ink-jet printer, a laser printer or the like may be employed in place of the thermal head.

The peeling means 13 comprises a peel plate 27 disposed at the downstream side of the raw sheet M in the feed-out direction with respect to the printing head 21, and is arranged so as to peel off the labels L one by one from the release liner S by sharply turning over the raw sheet M at the position of front end of the peel plate 27.

The sticking means 14 is detachably fixed via a bracket 30 fixed to the rear face side of the frame F. The sticking means 14 comprises a suction plate 32 having a rear-part label holding surface 32A that holds the rear-part label area L2 of the label L and a cylinder device 34 that supports the suction plate 32. The rear-part label holding surface 32A is formed with a plurality of suction holes (not shown) within the surface thereof, and is arranged so as to suck and hold the rear-part label area L2 by the operation of a decompression pump (not shown). The suction plate 32 is arranged so as to move forward/backward by the operation of the cylinder device 34 with respect to the label sticking surface of the object W.

Figure 6:
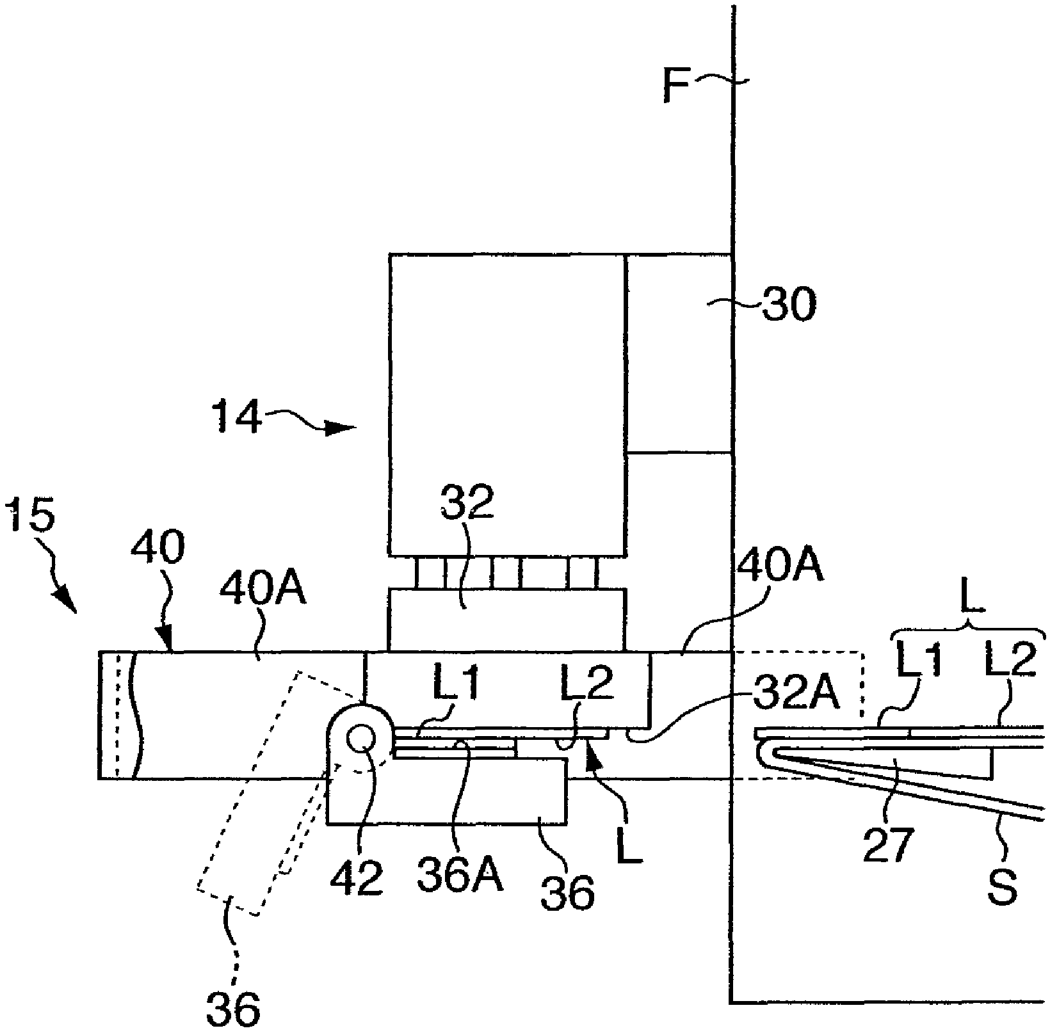
FIG. 6 is a partially enlarged front view of FIG. 5.

The turn-over means 15 comprises a turn plate 36 disposed beside the suction plate 32 of the sticking means 14 and a motor M1 that rotates the turn plate 36. The turn plate 36 and the motor M1 are detachably supported by the frame F via a support arm 40 having substantially L-like shape in plane view. In the turn plate 36, the lower face side thereof in FIG. 1 is formed as a front-part label holding surface 36A that sucks the front-part label area L1. The front-part label holding surface 36A is formed as a protruded plane substantially corresponding to the size of the front-part label area L1 (refer to FIG. 6). Owing to this arrangement, when the turn plate 36 is turned to a second position, which will be described later, the adhesive surface of the rear-part label area L1 is prevented from sticking to the turn plate 36. The front-part label holding surface 36A also has the same suction holes as those of the rear-part label holding surface 32A of the sticking means 14 for holding the rear-part label area L2 so as to suck the front-part label area L1 by the operation of a decompression pump (not shown). The turn plate 36 is arranged so as to turn between a first position aligned with the rear-part label holding surface 32A of the suction plate 32 and a second position opposing to the rear-part label holding surface 32A. The arm 40 includes a rear-arm piece 40A, which is to be a fixed side to the frame F, and a front-arm piece 40C, which is positioned in substantially parallel to the rear-arm piece 40A via a bent-arm piece 40B continuous with the outer end of the rear-arm piece 40A. The turn plate 36 is arranged to be rotatable via a pair of front-rear axes 42 provided to the front and rear arm pieces 40A, 40C. The axes 42 provided on the side of rear-arm piece 40A is coupled with an output shaft of the motor M1 so as to turn the turn plate 36 between the first and second positions by rotating drive of the motor M1.

The feed-out means 16 includes a drive roll 45, a pinch roll 46 for pinching the release liner S between the drive roll 45 and the same and a motor M2 for driving to rotate the drive roll 45.

The winding means 17 is composed of a winding roll 47 that fixes the lead end of the release liner S and winds the release liner S. The winding roll 47 is provided with a rotary shaft (not shown) protruding at the rear face side of the frame F. The rotary shaft is arranged to be coupled with the output shaft of the motor M2 constituting the feed-out means 16 so as to be driven via a driving force transmitting means (not shown) such as a pulley, belt or the like, and thus the release liner S is wound.

Now, the entire operation of this embodiment will be described. Here, for convenience of description, it is assumed that an object W is an article to be delivered to a home, and a label L is printed with delivery information and the like of the article.

A predetermined printing information is input in advance via an input device and control device (not shown), and the motor M2 of the feed-out means 16 is driven to start the operation of feeding out of the raw sheet M and winding of the release liner S.

When the label L passes through the printing head 21, the information input in advance is printed thereon. When printing, a lower-half area L1*b* of the front-part label area L1 in FIG. 3 is arranged as, for example, a delivery slip in which confidential information such as amount of money to be received, article description, date and so on is printed. An upper-half area L1*a* is arranged as a receipt in which information such as receiver's address and name, a seal column for reception is printed. On the rear-part label area L2, receiver's address and name, sender's address and appellation or name, and the like are printed.

The printed labels L are peeled off one by one at the front-end of the peel plate 27. While proceeding along the rear-part label holding surface 32A of the suction plate 32, the front-part label area L1 is sucked by the front-part label holding surface 36A of the turn plate 36 at the first position, and the rear-part label area L2 is sucked and held by the suction plate 32.

Figure 5:
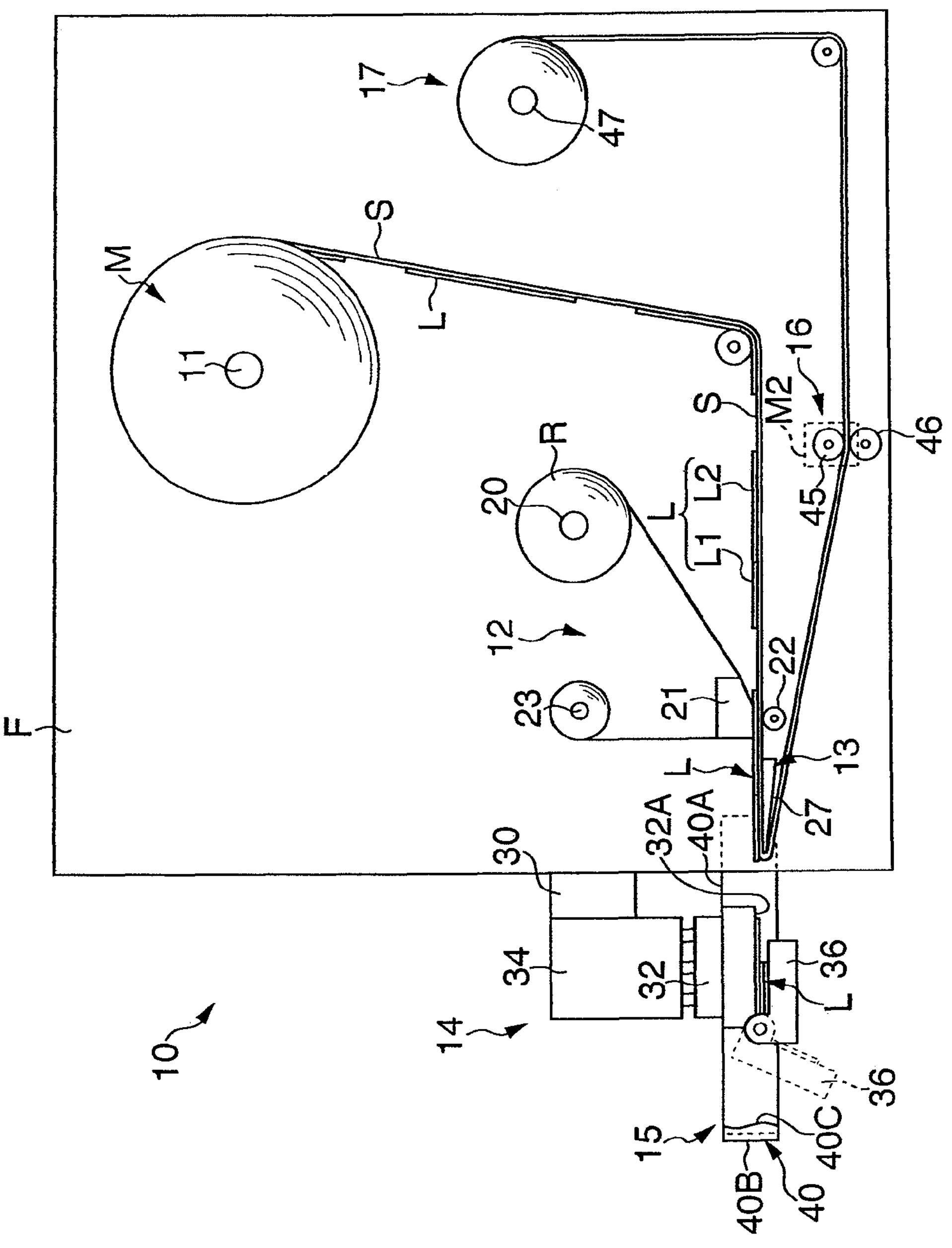
FIG. 5 is a schematic front view of the label printer showing a state that a turn plate is rotated to a second position.

Then, the motor M1 drives the turn plate 36 to rotate from the first position to the second position, and thereby the front-part label area L1 is turned over. That is, the adhesive surface of the front-part label area L1 is adhered to the adhesive surface of the rear-part label area L2 resulting in a thickness substantially equivalent to double layer (refer to FIG. 5 and FIG. 6). In this state, the adhesive surface of the rear-part label area L2 is kept in an exposed state in three outer peripheral sides of the turned over front-part label area L1.

When the turn-over operation is completed as described above, the turn plate 36 is returned to the first position. The cylinder 34 operates to lower the rear-part label holding surface 32A of the suction plate 32, and thereby sticking the label L onto the upper surface of the object W, which is conveyed below the cylinder 34.

Figure 7:
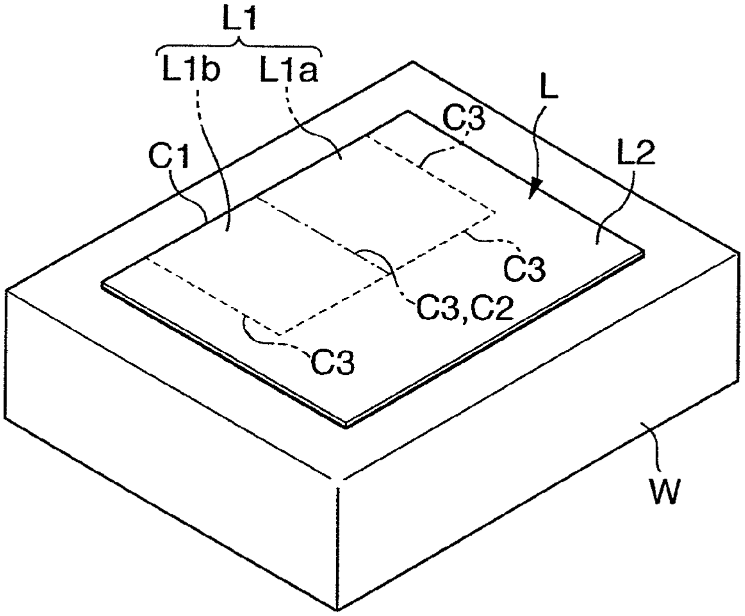
FIG. 7 is a schematic perspective view showing a state that the label is stuck on the object.

In the state that the label L is stuck on the object W, the label L has a substantially rectangular outer shape as shown in FIG. 7, and the front-part label area L1 is sandwiched between the rear-part label area L2 and the object W. Therefore, the deliverer can deliver the article while referring to the address and name of the receiver printed on the rear-part label area L2.

Figure 8:
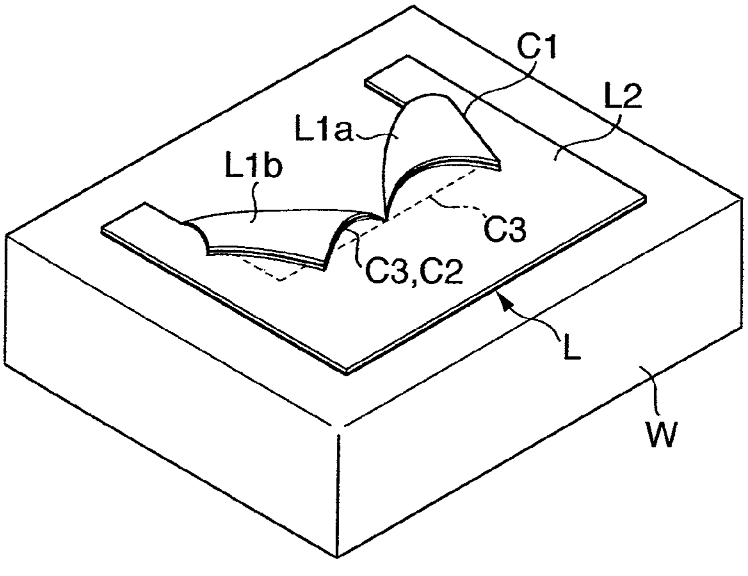
FIG. 8 is a schematic perspective view showing a state that a portion corresponding to a front part label area is cut off from the label stuck on the object.

After handing over the object W to the receiver, the deliverer cuts off the upper-half area L1*a* of the front-part label L1 along the perforated line C3 and the cut line C2 as shown in FIG. 8. Then, the deliverer requests the receiver to seal on the label as a reception sign, and collects the same. On the other hand, the receiver cuts off the lower-half area L1*b* along the perforated line C3, and confirms the name of the ordered article, the amount of money received and the like. Thus, the lower-half area L1*b* functions as a delivery slip for the receiver to confirm whether the delivered article (content) agrees with the ordered article.

Therefore, according to the embodiment as described above, it is possible to provide a label printer that has a function to perform the printing using a sheet type label and to stick the label to the object in a state that the confidential information is concealed.

The best arrangement and method for carrying out the present invention have been disclosed so far. However, the present invention is not limited to the above.

That is, the present invention has been illustrated and described mainly about a specific embodiment. However, it is possible for those skilled in the art to add various modifications, if necessary, to the above-described embodiment with respect to the shape, position and/or disposition without departing from the technical spirit and the range of the object of the present invention.

Figure 9:
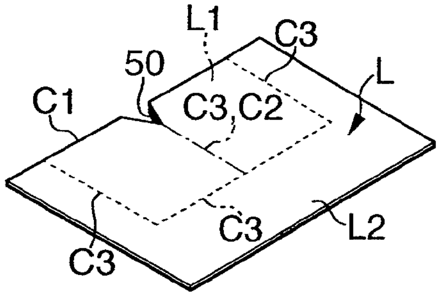
FIGS. 9A to 9E are schematic perspective views each showing a modification of the label applied to the label printer.
Figure 9:
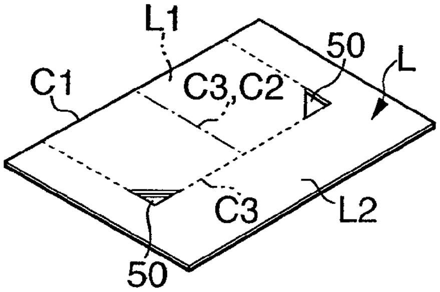
Figure 9:
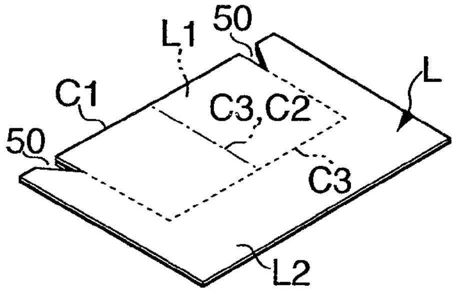
Figure 9:
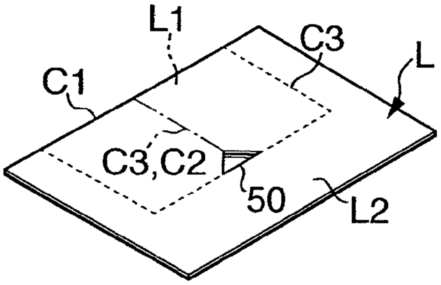
Figure 9:
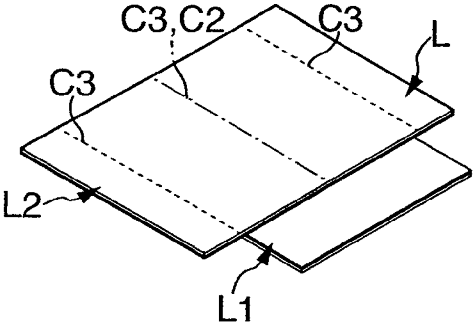

For example, the label L applied to the present invention is not limited to the example of the above described and illustrated arrangement. As shown in FIGS. 9A to 9D, in the state that the front-part label area L1 is turned over to the rear face side of the rear-part label area L2, a cutout portion 50 may be previously formed in order to facilitate a partial cutout of the front and rear-part label areas L1, L2. Also, it may be arranged so that, when the front-part label area L1 is turned over, the front-part label area L1 protrudes from the rear-part label area L2 as shown in FIG. 9E. Thus, the label can be easily cut off by pulling the protruding portion.

The plane configuration of the label L is not limited to a rectangular shape, but label L of a various plane shape like a polygonal, circular or elliptical shape may be included. In other words, the present invention permits various design changes provided that a printer has function to perform printing on the label and sticking the same in a state that the confidential information is concealed.

Further, in the above-described embodiment, the case where the front-part label area L1 is turned over has been described. However, it is possible to previously set a mode in which the turn-over means 15 is kept in a non-operation state. That is, when only printing on a label and sticking the same to the object W are sufficient processes and turning over the label is not required, the suction plate 32 of the sticking means 14 can hold the label L and perform sticking the same to the object W while the turn plate 36 of the turn-over means 15 is held at the first position. By enabling to select the operation mode as described above, the label printer 10 according to the present invention can provide versatility.

Furthermore, in the above-described embodiment, the case where the first label-forming area is the front-part label area L1, and the second label-forming area is the rear-part label area L2 has been illustrated and described. The present invention is not limited to the above. That is, by changing the mounting position of the turn-over means 15, the label L can be turned over in a width direction perpendicular to the feed-out direction of the label L. In other words, it is sufficient for the present invention that a partial area of the label L can be turned over so as to be sandwiched between the object W and the label L.

Still further, the rear face of the front-part label area L1 may not have the adhesive surface (in this case, including the case where the adhesive surface is subjected to a non-sticking processing). That is, in order to stick and hold the front-part label area L1 which is turned over, it is sufficient to have the adhesive surface on the rear face of the rear-part label area L2. Contrarily, in the case where the rear face of the front-part label area L1 has the adhesive surface, the portion of the rear-part label area L2 where the front-part label area L1 is turned over may not have the adhesive surface.

The invention claimed is:

1. A label printer, comprising:

a printing means for printing a label temporarily attached to one surface of a release liner;

a peeling means for peeling off the label from said release liner;

a sticking means for attaching the label onto a predetermined object while holding the label, which is peeled off by the peeling means, the sticking means having a label holding surface;

a rotating turn-over means for turning over only a front part of said label to a rear part of said label, wherein said turn-over means includes a turn plate configured to turn between a first position aligned with a label holding surface, and a second position that faces said label holding surface, said turn plate having a front part label holding surface having a substantially same plane area as that of the label area to be turned;

wherein said sticking means is configured to attach said label to said object such that the turned-over part of said label is sandwiched between said object and said label.

2. The label printer according to claim 1, wherein said turn plate is rotateable from the first position to the second position, wherein said part of said label is sucked, thereby turning over said part of said label.

3. The label printer according to claim 1, wherein said turn-over means is arranged so as to be held in a non-operation state, and said sticking means is arranged so as to allow sticking of labels which do not require turning over.

4. The label printer according to claim 1, wherein said turn plate is configured to rotate from the first position to the second position whereby said label, suctioned to said turn plate, is turned over.

5. The label printer according to claim 1, wherein when said sticking means is configured to stick labels that do not require turning over, said turn-over means is configured to be held in a non-operation state.

6. A label printer, comprising:

a printing means for printing a label adhered temporarily to one surface of a release liner disposed on a sheet;

a peeling means for peeling off said label from said release liner; and a sticking means for attaching the label peeled off by the peeling means onto a predetermined object, said label having a first label-forming area and a second label-forming area, connected to the first label-forming area, wherein said second label-forming area has a larger plane area than the first label-forming area, and said first label-forming area and said second label-forming area each have an adhesive surface;

a rotating turn-over means for turning over only said first label-forming area to a rear face side of the second label-forming area, said turn-over means includes a turn plate, configured to turn between a first position aligned with a label holding surface of said attaching means and a second position that faces said label holding surface;

wherein said label holding surface has a substantially same plane area as that of the label area to be turned over; and wherein said sticking means attaches said second label-forming area onto said object wherein the adhesive surface of the first label-forming area is attached to the adhesive surface of the second label-forming area, and the first label-forming area is sandwiched between said object and the second label-forming area.

7. The label printer according to claim 6, wherein when said sticking means is configured to stick labels that do not require turning over, said turn-over means is configured to be held in a non-operation state.

8. A label printer for attaching a label to an object, comprising:

a printing device configured to print a label temporarily attached to one surface of a sheet having a release liner, the label having a front-part area and a rear-part area;

a peel plate configured to peel off the label from said release liner;

a suction plate having a rear-part area holding surface and a cylinder device for holding the suction plate, the rear-part area holding surface configured to suction and hold the rear-part area, the cylinder device configured to move the suction plate to and attached the label to a label sticking surface of the object;

a rotateable turn plate disposed besides the suction plate; and a motor configured to turn the turn plate;

wherein the turn plate is configured to rotate and turn over the front-part area, and includes a front-part area holding surface, wherein the turn plate is configured to rotate between a first position aligned with the rear-part area holding surface of the suction plate and a second position opposing the rear-part area holding surface, wherein said suction plate and cylinder device are configured to attach said label to said object such that the turned-over front-part area is sandwiched between said object and said rear- part area.

* * * * *